US 9,880,272 B2

(12) United States Patent
Huang et al.

(10) Patent No.: US 9,880,272 B2
(45) Date of Patent: Jan. 30, 2018

(54) CALCULATION OF DETECTING DEPTH AND MOVING SPEED OF OBJECTS WITH CODED PULSES BASED ON SPEED CHANGES OF ULTRASOUND/SOUND

(71) Applicants: Hai Huang, Herndon, VA (US); Tony Huang, Herndon, VA (US)

(72) Inventors: Hai Huang, Herndon, VA (US); Tony Huang, Herndon, VA (US)

(73) Assignee: Hai Huang, Herndon, VA (US)

( * ) Notice: Subject to any disclaimer, the term of this patent is extended or adjusted under 35 U.S.C. 154(b) by 571 days.

(21) Appl. No.: 14/645,475

(22) Filed: Mar. 12, 2015

(65) Prior Publication Data

US 2015/0185318 A1    Jul. 2, 2015

Related U.S. Application Data

(63) Continuation of application No. 13/341,928, filed on Dec. 31, 2011, now abandoned, and a continuation of application No. 14/305,074, filed on Jun. 16, 2014, now abandoned, and a continuation of application No. 14/532,125, filed on Nov. 4, 2014, and a continuation of application No. 14/629,585, filed on Feb. 24, 2015, now abandoned.

(51) Int. Cl.
*G01S 15/58*      (2006.01)
*G01S 7/523*      (2006.01)
*G01S 15/89*      (2006.01)
*G01S 15/02*      (2006.01)

(52) U.S. Cl.
CPC .............. *G01S 7/523* (2013.01); *G01S 15/02* (2013.01); *G01S 15/58* (2013.01); *G01S 15/8986* (2013.01)

(58) Field of Classification Search
CPC ...... G01S 15/58; G01S 15/8986; G01S 15/02; G01S 7/523
USPC .................... 367/89; 600/437, 448, 454, 455
See application file for complete search history.

(56) References Cited

U.S. PATENT DOCUMENTS

| | | | | |
|---|---|---|---|---|
| 5,877,997 | A * | 3/1999 | Fell | G01F 23/2962 367/908 |
| 2006/0064015 | A1* | 3/2006 | Davies | G01S 7/52028 600/447 |
| 2012/0266676 | A1* | 10/2012 | Mueller | G01F 1/66 73/632 |

* cited by examiner

*Primary Examiner* — Isam A Alsomiri
*Assistant Examiner* — Amie M Ndure

(57) ABSTRACT

During transmission, a speed of ultrasound pulses gradually reduces due to their energy loss from acoustic impedance. A thickness and a density of piezoelectric (PZT) elements and a sound speed in the PZT elements decides energy of the ultrasound pulses and their detecting depth. A speed of moving objects and an angle of the moving objects with the ultrasound pulses may change a speed of reflected ultrasound pulses and affect their time of flight (TOF) and TOF shift. A method of Coding ultrasound pulses combines advantages of a continuous wave ultrasound and a pulsed wave ultrasound. So, it can be used to obtained the TOF and the TOF shift and calculate the depth and the moving speed of the detecting objects, which also avoids a problem of an aliasing for highly moving speed of the objects.

20 Claims, 16 Drawing Sheets

CALCULATION OF DETECTING DEPTH AND MOVING SPEED OF OBJECTS WITH CODED PULSES BASED ON SPEED CHANGES OF ULTRASOUND/SOUND

CROSS-REFERENCES TO RELATED APPLICATIONS

This application claims priority to U.S. patent application Ser. No. 13/341,928 filed on Dec. 31, 2011, and U.S. patent application Ser. No. 14/305,074 filed on Jun. 16, 2014, and U.S. patent application Ser. No. 14/532,125 filed on Nov. 4, 2014, and U.S. patent application Ser. No. 14/629,585 filed on Feb. 24, 2015, the entire contents of all of which are incorporated herein by reference.

FIELD OF THE DISCLOSURE

The present disclosure generally relates to the field of sound/ultrasound technology and, more particularly, relates to a method for calculation of detecting depth and speed of moving objects based on speed changes of sound/ultrasound.

BACKGROUND

Transmission of ultrasound pulses is actually energy traveling of acoustic pulses in transmitting medium. If there is acoustic impedance during the transmission of the ultrasound pulses, the acoustic impedance will resist the movement of the ultrasound pulses. Currently, it is supposed that speed of the ultrasound pulses is fixed in the same medium during the transmission. But, in the invention, the speed of the ultrasound pulses is considered as gradually reduced during the transmission due to the acoustic impedance of the transmitting medium, which gradually depletes the energy of the ultrasound pulses. According direct relationship between the acoustic impedance and a speed of the ultrasound pulses in the transmitting medium, higher speed of the ultrasound pulses will meet higher acoustic impedance and consume more its energy during the transmission. So, the question is if the speed of the ultrasound pulses can still keep the same as currently supposed when its energy is gradually reduced until exhausted? If the speed of the ultrasound pulses is gradually reduced during transmission, the detecting depth may be wrong based on calculating the detecting depth with fixed ultrasound speed for the ultrasound pulses with different frequencies.

Comparing lower frequency of the ultrasound pulses, higher frequency of the ultrasound pulses has larger attenuation coefficient and thus is more readily absorbed in the transmitting medium, which limits the detecting depth of the ultrasound pulses. So, if there is way to increase the detecting depth for high frequency ultrasound?

Ultrasound pulses can be reflected by motionless or moving objects, and it is currently considered that forward moving objects can compress the frequency of the ultrasound pulses and reversely moving objects decompress the frequency of the ultrasound pulses. So, Doppler has been widely used to measure the velocity of the moving objects based on frequency shift, such as medical ultrasound machine and Doppler radar. In Doppler of the pulsed wave ultrasound, aliasing is explained with insufficient Doppler sampling rate of the frequency domain analysis. But, the theory of the frequency domain can not completely solve the aliasing problem in Doppler of the pulsed wave ultrasound and the color ultrasound.

Thus, there is a need to overcome above problems to provide methods for more accurately calculating the detecting depth of ultrasound pulses, increasing the detecting depth of high frequency ultrasound, correctly calculating the speed of moving objects and correcting the aliasing for the pulsed wave and the color ultrasound.

BRIEF SUMMARY OF THE DISCLOSURE

One aspect of the invention, correcting the transmitting distance of ultrasound pulses can rectify the registration of the detecting depth, which improves the quality of ultrasound images. Current sound/ultrasound theories and applications are based on the fixed average speed in the same transmitting medium. But, the invention is based the speed reduction of sound/ultrasound during the transmission in the medium due to the loss of their energy caused by acoustic impedance. For ultrasound, calculating of the detecting depth of ultrasound pulses based on the fixed average speed of the ultrasound pulses will cause miscalculation of the detecting depth due to different average speed for the ultrasound pulses with different quantities. Because the speed of ultrasound pulses is inversely correlated to a quantity of the ultrasound pulses and directly correlated to a density of the transmitting medium and a speed of the ultrasound pulses, they can be used to calculate the ultrasound speed reducing coefficient and correct the registration of detecting depth of ultrasound pulses, which improve the quality of images.

In another aspect of the invention, changing thickness and density of piezoelectric (PZT) elements and sound speed in the PZT elements can regulate energy of the ultrasound pulses, which affect their detecting depth. The detecting depth of the ultrasound pulses is not directly related to their frequencies, but related to the energy of the ultrasound pulses, which contains a quantity and a speed of the ultrasound pulses. The quantity of the ultrasound pulses is decided by the thickness and the density of PZT elements. The more thickness and density of the PZT elements will generate the greater quantity of the ultrasound pulses, which increase their detecting depth. At the same time, selecting the PZT with greater density and higher speed of ultrasound pulses in the PZT elements will increase the detecting depth for high frequency ultrasound.

Another aspect of the invention is detecting the speed of moving objects based on time of flight (TOF) shift of time domain analysis for a continuous wave, a pulsed wave and a color ultrasound. It is based on the speed changes of reflected ultrasound pulses by the moving objects, which change the TOF and the TOF shift of the ultrasound pulses. As the ultrasound pulses are emitted from activated PZT, the ultrasound pulses contain their quantity. No matter in the continuous wave or the pulsed wave or the color ultrasound, when checking the speed of blood flow, the ultrasound system always detects the reflected ultrasound pulses from certain locations where ultrasound beam cross with blood vessels to calculate the TOF shift. So, the speed of the moving objects can be calculated based on the TOF shift. The moving objects may change the rebounding forces to the ultrasound pulses, which is decided by the speed and angle of the moving objects with the ultrasound beam. Faster forward speed and/or greater angle of the moving objects with the ultrasound beam will produce greater rebounding force, which generates greater reflected speed of the ultrasound pulses and results in shorter TOF and greater TOF shift. On the contrary, faster reversed speed and/or smaller angle of the moving objects with the ultrasound beam will reduce the rebounding force, which produces slower reflected speed of the ultrasound pulses and results in longer TOF and greater TOF shift. For the continuous, the pulsed wave and the color ultrasound, the speed of the moving objects can be calculated based on the TOF shift.

In the invention, the theory of above TOF and TOF shift can be used to completely correct an aliasing for the pulsed wave and the color ultrasound no matter how fast the speed of the moving objects will be. A calculated TOF is based on the average speed of ultrasound pulses in the transmitting medium and distance between transducer and the gate. A detected TOF is the time that the ultrasound system interprets from emitted ultrasound pulses and reflected ultrasound pulses. An actual TOF, which is an actual traveling time of the ultrasound pulses between transducer and the detecting objects. The detected TOF will be affected by the moving objects. If the speed of the moving objects is too fast, which makes the actual TOF excesses its aliasing limit, the ultrasound system will misinterpret the reflected ultrasound pulses and generate the aliasing TOF. For the forward moving objects, the aliasing limit for the actual TOF is less than the value of half calculated TOF. If the actual TOF is smaller than the aliasing limit, the ultrasound system will misinterpret the reflected ultrasound pulse and add a value of calculated TOF into the actual TOF, which generates the aliasing TOF. Then the aliasing TOF is greater than the calculated TOF. So, the aliasing TOF shift is below the baseline, which represents the moving objects toward opposite direction. For reversely moving objects, their TOF aliasing limit is that the actual TOF is greater than the value of one and half calculated TOF. If the actual TOF is greater than its aliasing limit, the ultrasound system will misinterpret the detected TOF and subtract a value of calculated TOF from the actual TOF. Then the aliasing TOF is smaller than the calculated TOF. So, the aliasing TOF shift is above the baseline, which represents the moving objects as forward direction. So, in the invention, a computer program is designed to identify and correct the aliasing TOF shift no matter how fast the speed of the moving objects will be. Identifying and correcting the aliasing TOF shift can also be used to differentiate the colors of aliasing from the colors of the turbulent flow, which benefits clinical judgment and diagnosis.

The continuous ultrasound doesn't contain information of depth and the pulsed wave ultrasound may generate a problem of aliasing. In the invention, a method of coded ultrasound pulses is used to take advantages of the continuous wave ultrasound and the pulsed wave ultrasound, which can obtain information of depth and speed of the detecting objects at the same time, and avoid the aliasing. Within each pulse duration, different numbers of ultrasound pulses are sent, which is assigned a pulse character. Coded pulse characters are emitted with a same rest period, which is between the pulse duration. Coding pulse characters endow each pulse character with information of sending time. The TOF of the pulse characters can be obtained by comparing time of the sending pulse characters with time of the receiving pulse characters, and TOF shift can be obtained from the difference of sending rest period and receiving period of the pulse characters. Therefore, the depth and the speed of the detecting objects can be obtained from the TOF and the TOF shift.

Based on the speed reduction of the ultrasound/sound during the transmission, the quantity of the ultrasound pulses, the TOF, and the TOF shift can more accurately present the relationship between the ultrasound pulses with the depth and the speed of the detecting objects than the results from the fixed ultrasound speed and the Doppler shift. Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
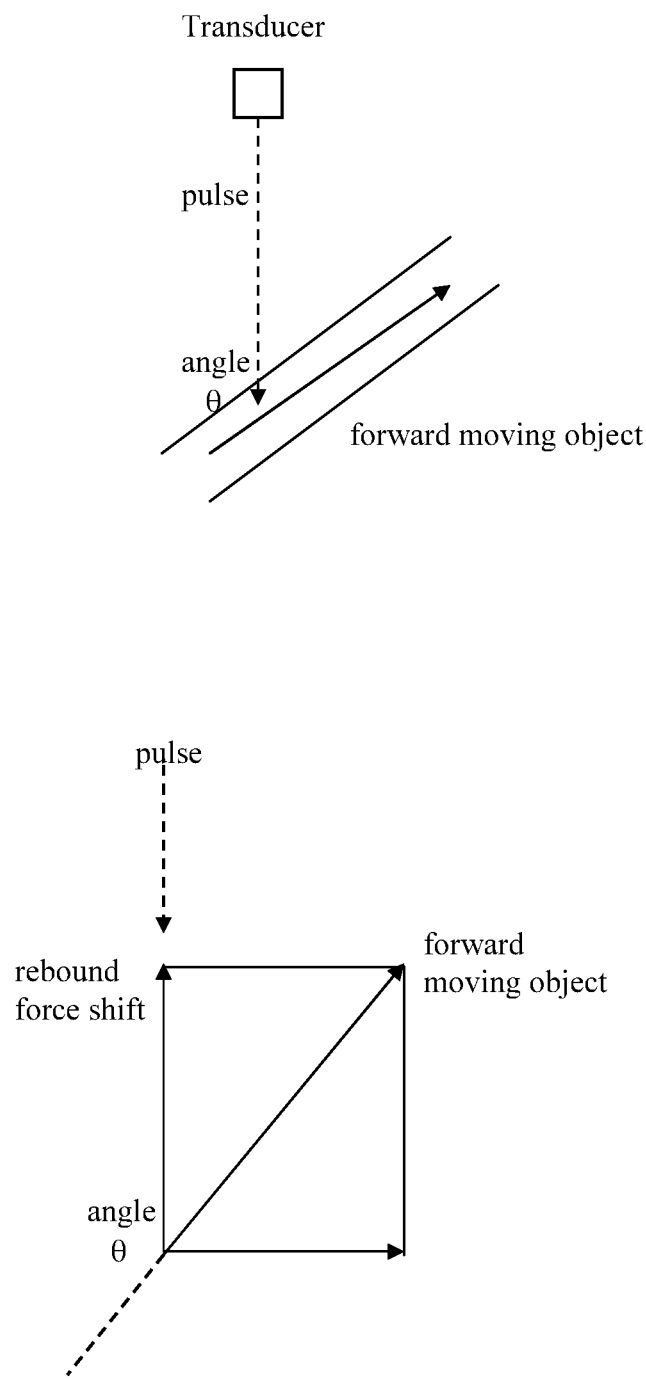
FIG. 1 is a schematic illustration of rebound force of forward flow to ultrasound pulse.

Reference will now be made in detail to exemplary embodiments of the disclosure, which are illustrated in the accompanying drawings. Wherever possible, the same reference numbers will be used throughout the drawings to refer to the same or like parts.

Speed of Ultrasound Pulses Gradually Reduces During Transmission

Transmitting in a medium, a sound pulse contains energy, which includes two factors: quantity and speed. The quantity of the sound pulse is related to thickness and density of materials that create the sound. The thicker material gives greater quantity of the sound, which is like different sounds from different chords of a violin. The density of the sound is related to density of materials that create the sound. The higher density of the materials is, the greater density of the sound will be, such as the sounds launched from wood or metal. The energy of the sound is related its quantity and speed. A sound pulse with greater energy will travel faster. The speed of the sound will gradually reduce due to the acoustic impedance of transmitting medium, which gradually depletes the energy of the sound.

Piezoelectric elements (PZT) in a transducer of ultrasound machine emit ultrasound pulses with their quantity, density, speed and energy. The energy of the ultrasound pulses transmitted in a medium is related to the quantity and speed of the ultrasound pulses. Nowadays, the speed of the ultrasound pulses is considered as fixed in the same medium. But, actually the speed of the ultrasound pulses is not fixed at the same speed as supposed during the transmission, and it will gradually reduce due to acoustic impedance of the transmitting medium. As bullets shooting from a machine gun, their speed is gradually reduced due to loss of their energy caused by resistance of air. But, frequency of the bullets at any sites of trajectory may be kept the same. The transmission of the ultrasound pulses has the similar mechanism. The acoustic impedance is decided by density of the transmitting medium and the average speed of the ultrasound pulses in the transmitting medium. During the transmission, the speed of the ultrasound pulses gradually reduces due to the loss of their energy caused by the acoustic impedance, which will finally exhausts the energy of the ultrasound pulses. But, Ultrasound pulses keep the same frequency during the transmission, including reflected frequency. A rate of the speed change of ultrasound pulses is related to the density of the transmitting medium, sound speed in the transmitting medium, and the quantity of the sound pulses. So, speed reducing coefficient can be used to express the relationship between the speed change and the quantity of the ultrasound pulses.

Sound quantity=$PZT$thickness×$PZT$density

Sound energy=sound quantity×sound speed

Calculation of Detecting Depth of Ultrasound Pulses Based on Speed Change of the Ultrasound Pulses One aspect of the invention is calculation of detecting depth of the ultrasound pulses due to the speed reduction of the ultrasound pulses during the transmission. Nowadays, calculating the detecting depth is based on an average speed of the ultrasound pulses in the transmitting medium, which may miscalculate the detecting depth due to different quantity and average speed of the ultrasound pulses. As the ultrasound pulses leave the PZT elements and enter the transmitting medium, the speed of the ultrasound pulses is at their maximal speed. Then, under effect of the acoustic impedance, the speed of the ultrasound pulses will gradually reduce during the transmitting process. The longer the ultrasound pulses travel, the slower the speed of the ultrasound pulses will be. So, the speed reducing coefficient of the ultrasound pulses can be used to calculate a distance shift. The speed reducing coefficient is directly proportional to the density of the transmitting medium and the sound speed in the PZT elements, and inversely proportional to the quantity of the ultrasound pulses. The sound speed in the PZT elements is directly correlated to the maximal speed of the ultrasound pulses in the transmitting medium as they enter the transmitting medium. The depth shift is caused by speed reduction of the ultrasound pulses during the transmission. The depth shift of the ultrasound pulses is a half value of multiplication result of the speed reducing coefficient and maximal speed in the transmitting medium and traveling time of the ultrasound pulses. $V_m$ is a maximal speed of the ultrasound pulses as they just enter a transmitting medium. t is the traveling time from emitting to receiving the ultrasound pulses. A average speed ($V_{avg}$) of the ultrasound pulses is a difference between the maximal speed of the ultrasound pulses in the transmitting medium with a multiplication result of the speed reducing coefficient and the maximal speed of the ultrasound pulses in the transmitting medium. The detecting depth is a half value of multiplication result of the average speed and the traveling time.

Currently there is just one average speed of the ultrasound pulses in each transmitting medium. For instance, the speed of the ultrasound pulses in the soft tissue is about 1540 meter/second. But a change of the quantity of the ultrasound pulses in the transmitting medium affects their average speed in the transmitting medium. Such as there may be a difference of the speed reducing coefficient between the ultrasound pulses with 4 MHz and the ultrasound pulses with 8 MHz because of the difference of their quantity of the ultrasound pulses. So, their average speed in the soft tissue may be different, and their detecting depth may be also different at the same traveling time. Calculating the detecting depth with a fixed average speed may cause an error in their actual traveling depth. Because multiple factors affect the energy and the speed of the ultrasound pulses, such as reflection, absorption and scattering, the mathematic equation of the average speed of the ultrasound pulses just reflects a relationship of the average speed with the quantity of the ultrasound pulses, which represents different quantity of the ultrasound pulses with different average speed. Therefore, it is necessary to more accurately calculate the detecting depth based on the different average speed of the ultrasound pulses in the transmitting medium according to the change of the quantity of the ultrasound pulses.

$$\text{Speed reducing coefficient} = \frac{\text{medium density} \times \text{sound speed in } PZT}{\text{sound quantity}}$$

$$= \frac{\text{medium density} \times \text{sound speed in } PZT}{PZT \text{ density} \times PZT \text{ thickness}}$$

Depth shift = speed reducing coefficient × $V_m$ × $t/2$

Detecting depth = $V_m$ × $t/2$ − Depth shift

= $V_m$ × (1 − speed reducing coefficient) × $t/2$ $V_{avg} = V_m$ × (1 − speed reducing coefficient)

Detecting depth = $V_{avg}$ × $t/2$

The Quantity of the Ultrasound Pulses Affect their Detecting Depth

In another aspect of the invention, increasing the quantity of the ultrasound pulses increases the detecting depth of the ultrasound pulses. The energy of the ultrasound pulses equals the multiplication value of sound quantity and sound speed. Increasing one or more of the thickness and the density of PZT elements increases the sound quantity, and increasing sound speed of the ultrasound pulses also increases the energy of the ultrasound pulses, which increase the detecting depth.

In current ultrasound theory, the attenuation coefficient is directly proportional to the frequency of the ultrasound pulses. The lower the frequency of the ultrasound pulses is, the smaller the attenuation coefficient will be. As the frequency of the ultrasound pulses is inversely proportional to the thickness of the PZT elements, the more thickness of PZT has lower frequency of the ultrasound pulses.

Frequency=sound speed in $PZT/2 \times PZT$thickness

Actually, the thickness and the density of the PZT elements are directly related to the quantity of the ultrasound pulses. The more thickness and the density of the PZT elements, the more PZT elements will be activated, which generate greater quantity of the ultrasound pulses. Therefore, the attenuation coefficient is actually decided by the quantity of the ultrasound pulses, which is related the thickness and the density of the PZT elements. As a heavier ball has ability of further traveling distance, the ultrasound pulses with greater quantity will have greater penetrating depth because it has lower attenuation coefficient, and have smaller reducing rate of its speed comparing to the ultrasound pulses with smaller quantity. So, changing the thickness and the density of the PZT elements can regulate the quantity of the pulses and its detecting depth.

Attenuation Coefficient (dB/cm)=sound speed in $PZT$/sound quantity

Sound quantity=$PZT$thickness×$PZT$density

Sound energy=sound quantity×sound speed

Increasing Detecting Depth for High Frequency Ultrasound by Increasing its the Density of PZT Elements and Sound Speed in the PZT Elements In another aspect of the invention, increasing the density of the PZT elements and sound speed in the PZT elements will increase the detecting depth for high frequency ultrasound. Increasing the density of the PZT elements increases the density of the ultrasound pulses. At the same time, increasing sound speed in the PZT elements will increase a frequency of the ultrasound pulses as well as the energy of the ultrasound pulses. Currently, in order to increase the frequency of the ultrasound pulses, the thickness of the PZT elements is reduced, which decreases the quantity of the ultrasound pulses and their detecting depth. But, in the invention, by creating a transducer with greater density of the PZT elements and higher sound speed in the PZT elements, but not just decreasing the thickness of the PZT elements, it will increase the frequency as well as the quantity and energy of the ultrasound pulses. As the result, it increases the detecting depth for high frequency ultrasound.

Frequency=sound speed in $PZT/2 \times PZT$thickness

Quantity of ultrasound pulses=$PZT$thickness×$PZT$density

Energy=Quantity of ultrasound pulses×speed

Total attenuation (dB)=attenuation coefficient×distance

Improving Axial Resolution of the Ultrasound Pulses by Decreasing Thickness of the PZT Elements Currently increasing frequency of the ultrasound pulses is used to increase axial resolution. Actually, the axial resolution is decided by length of the ultrasound pulses, which is related to the thickness of the PZT elements. But, the frequency of the ultrasound pulses is not directly related to the axial resolution of the ultrasound pulses, because thin PZT elements can generate high frequency as well as low frequency of the ultrasound pulses. Less thickness of the PZT elements generates shorter ultrasound pulses and smaller numerical values of spatial pulse length, which improve the axial resolution.

At the same time, the thickness of the PZT elements also limits the highest frequency a ultrasound system can reach, which is less than a value of sound speed in PZT elements divided by a length of the ultrasound pulses.

Highest frequency<sound speed in $PZT/PZT$thickness

Moving Objects Change TOF and TOF Shift of the Ultrasound Pulses

Figure 2:
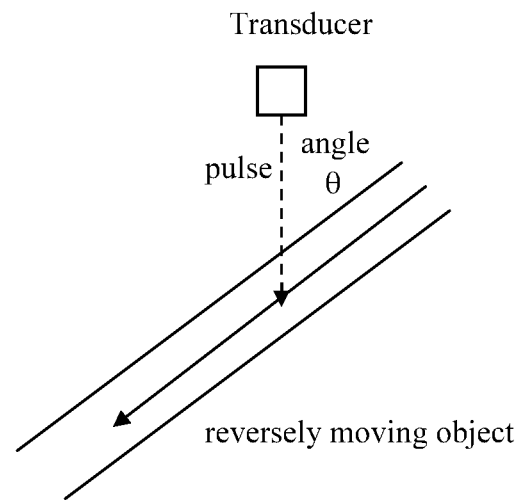
FIG. 2 is a schematic illustration of rebound force of reversed flow to ultrasound pulse.
Figure 2:
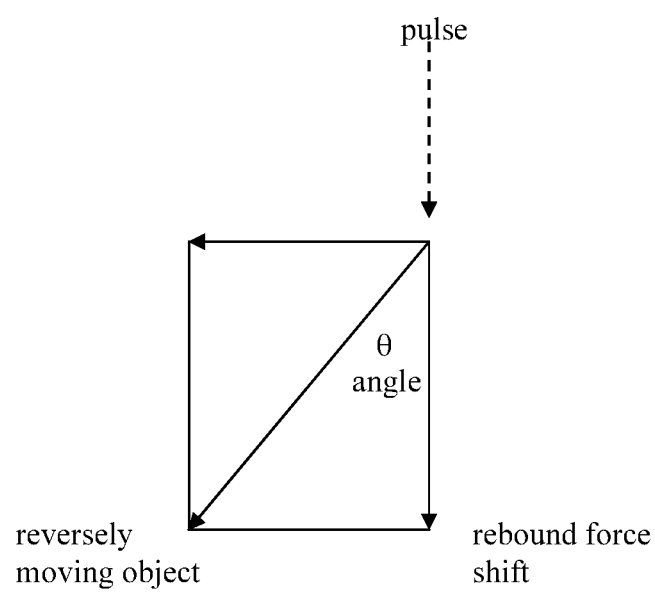

As containing the quantity and the energy, the ultrasound pulses can be reflected by motionless or moving objects. No matter in the continuous wave or the pulsed wave or the color ultrasound, when checking speed of blood flow, the ultrasound system always detects the reflected ultrasound pulses from fixed locations where the ultrasound beam cross with blood vessels to calculate TOF shift of the reflected ultrasound pulses. So, it is unlike changes of sounds from coming or leaving motorcycle, because distance of the motorcycle is changing. But more like playing table tennis, a racket hits a ball at fix location and changes speeds of the reflected ball, which changes TOF of the ball. Comparing to motionless objects, moving objects will change the rebounding force to the ultrasound pulses. As in the FIG. 1, forward moving objects will generate the forward rebound force shift against the ultrasound pulses. The forward rebounding force shift is decided by speed and angle θ of the moving objects with the ultrasound beam. The faster speed of the moving objects and greater angle θ will generate greater forward rebounding force shift, which increases the speed of the reflected ultrasound pulses. So, its TOF is decreased and smaller than the TOF from motionless objects (baseline). As the result, the TOF shift is increased and above the baseline. On the contrary, as in the FIG. 2, reversely moving objects will generate reversed rebounding force shift with the same direction of emitted ultrasound pulses, which reduces the rebounding force. The faster speed of the moving objects and smaller angle θ will create greater reversed rebounding force shift, which decreases the reflected speed of the ultrasound pulses. So, its TOF is increased and greater than the baseline. As the result, the TOF shift is below baseline.

As the quantity of the ultrasound pulses is directly related the thickness and density of the PZT elements, changing the quantity of the ultrasound pulses also affects their TOF and TOF shift. For the forward moving objects, increasing the quantity of the ultrasound pulses will have smaller rate of increased speed of the reflected pulses. It elongates their actual TOF and reduces their TOF shift. Decreasing the quantity of the ultrasound pulses have greater rate of increased speed of the reflected ultrasound pulses, which will shorten their TOF and increase their TOF shift. For reversely moving objects, increasing the quantity of the ultrasound pulses will have smaller rate of decreased speed of the reflected ultrasound pulses. It shortens its actual TOF and decreases their TOF shift. Decreasing the quantity of the ultrasound pulses have greater rate of decreased speed of the reflected ultrasound pulses, which elongates their TOF and increase their TOF shift.

So, one aspect of the invention is calculating the speed of the moving objects based on the TOF shift for the continuous wave or the pulsed wave or the color ultrasound. As mentioned above, the speed of the ultrasound pulses will gradually reduce, and the moving objects will generate the rebounding force shift, which changes the speed of the reflected ultrasound pulses, their TOF and TOF shift. Therefore, the TOF shift can more accurately present relationship between the speed of the moving objects and characters of the ultrasound pulses.

Calculating Speed of Moving Objects Based on TOF Shift for Continuous Wave Ultrasound Currently, it is considered that speed of the ultrasound pulses is fixed in the same medium during the transmission. The moving objects will change the frequency of the reflected ultrasound pulses. The forward moving objects will compress the reflected frequency, which is higher than the emitted frequency. Its Doppler shift is above the baseline. The reversely moving objects will decompress the reflected frequency, which is lower than the emitted frequency. Its Doppler shift is below the baseline. So, calculating Doppler shift of the continuous wave (CW) ultrasound is based on difference between the reflected frequency and the emitted frequency.

$$\text{Doppler shift} = \text{reflected frequency} - \text{emitted frequency}$$

$$\text{Doppler shift} = \frac{2 \times \text{speed of moving objects} \times \text{transducer frequency} \times \cos\theta}{\text{pulse propagation speed}}$$

Figure 7:
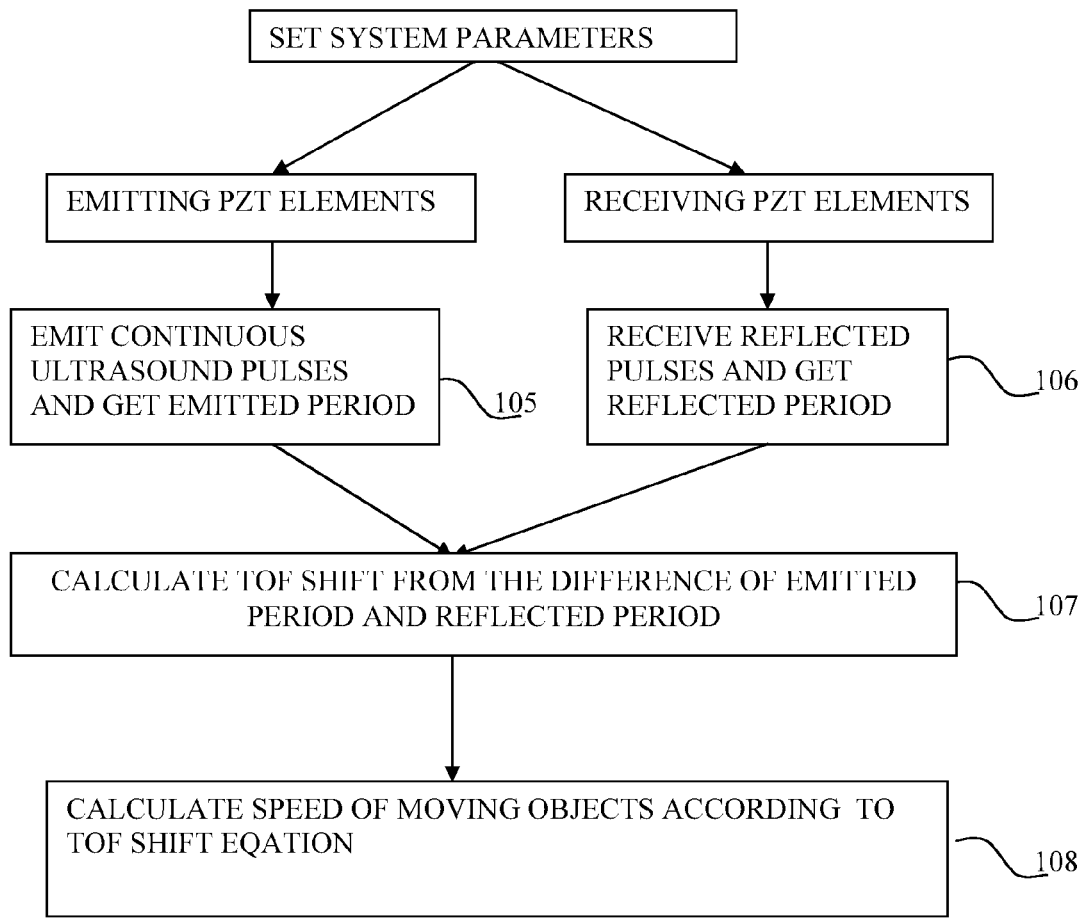
FIG. 7 is a schematic illustration of computer program to calculate TOF shift of continuous wave ultrasound.

The invention discloses that TOF shift of the CW ultrasound is used to calculate the speed of the moving objects. The TOF shift of the CW ultrasound is difference between a time of emitting period and a time of reflected period. There are two PZT parts in CW ultrasound transducer. As in the FIG. 7, the emitting PZT part emits the continuous wave ultrasound pulses with identical emitted period between previous and following emitted ultrasound pulses (105), which is decided by the ultrasound system. The receiving PZT part receives the reflected ultrasound pulses and detects the reflected period between previously and following reflected ultrasound pulses (106). The reflected period is decided by the speed of the moving objects and the angle of the moving objects with the beam of ultrasound pulses. If the ultrasound pulses are reflected from motionless objects, the reflected period equals to the emitted period. So, the emitted period is set as baseline, and the TOF shift equals zero at the baseline. Then, the ultrasound system obtains the TOF shift from difference between the emitted period and the reflected period, and calculates speed of the moving objects according to the equation of the TOF shift (108).

As 101 in FIG. 3, the emitted period is the time between the previously and following emitted pulses, which forms the baseline. The reflected period is the time between previously and following reflected ultrasound pulses. If the ultrasound pulses are reflected from the moving objects that are vertical to the ultrasound beam (flow N), the emitted period equals to its reflected period, and the TOF shift is zero. But, if ultrasound pulses are reflected from the forward moving objects (flow M), the speed of the reflected ultrasound pulses will be accelerated due to the increasing rebounding force, which shorten the TOF M'. So, the reflected period will be less than the time of the emitted period, which generates TOF shift M' and is above the baseline. On the contrary, for the reversely moving object (flow O), the TOF O' will be elongated due to the reduced rebounding force and the speed of the reflected ultrasound pulses. So, the reflected period will be greater than the time of the emitted period, which generates the TOF shift O' and is below the baseline.

$$\text{emitted period} = \text{the time between previous and following emitted pulses}$$

$$\text{reflected period} = \text{the time between previously and following reflected pulses}$$

$$\text{TOF shift} = \text{emitted period} - \text{reflected period}$$

$$\text{TOF shift} = \frac{2 \times \text{speed of moving objects} \times \text{transducer frequency} \times \cos\theta}{\text{pulse propagation speed}}$$

Figure 3A:
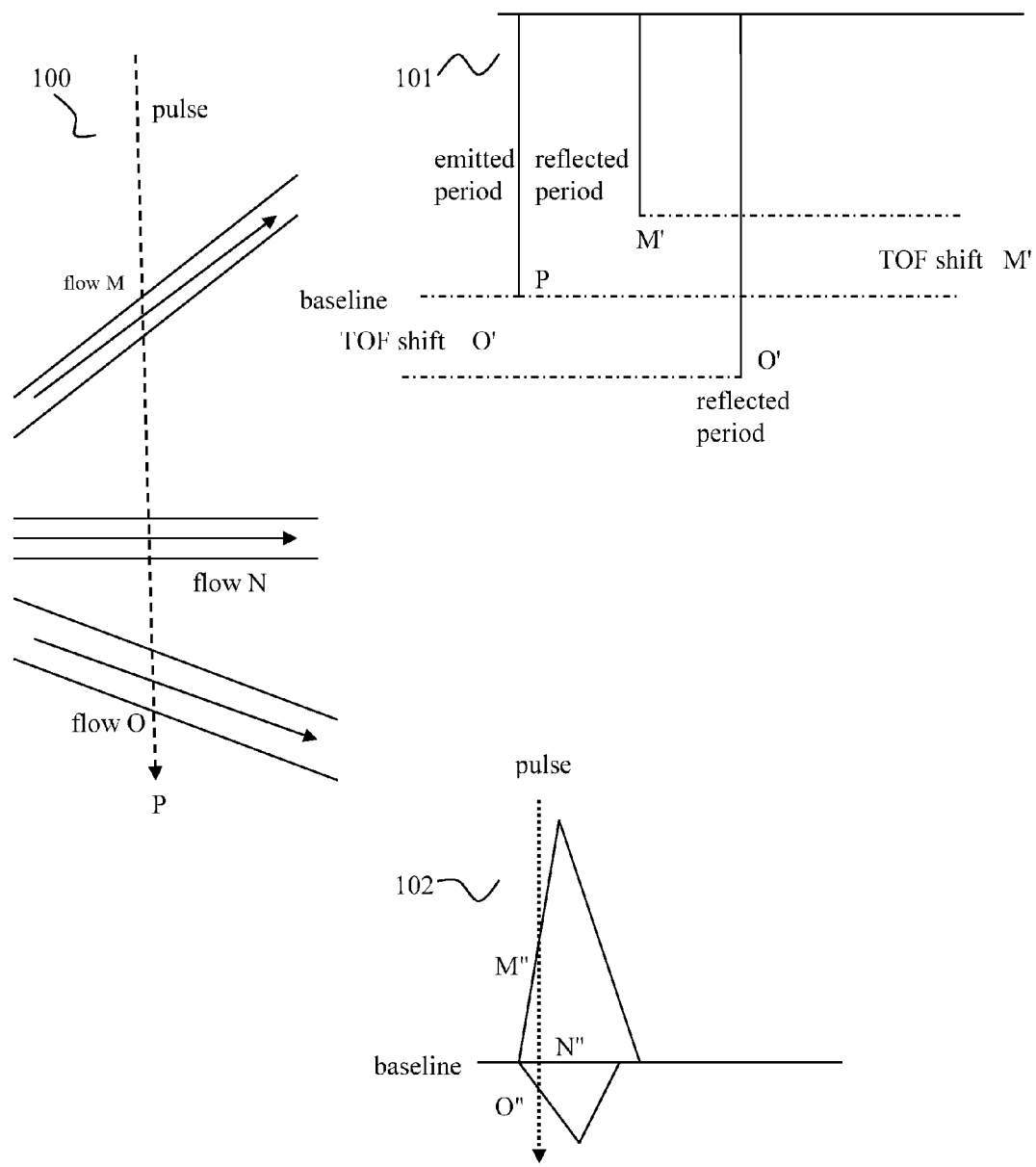
FIG. 3a is a schematic illustration of spectrum for TOF shift of continuous wave ultrasound.
Figure 3B:
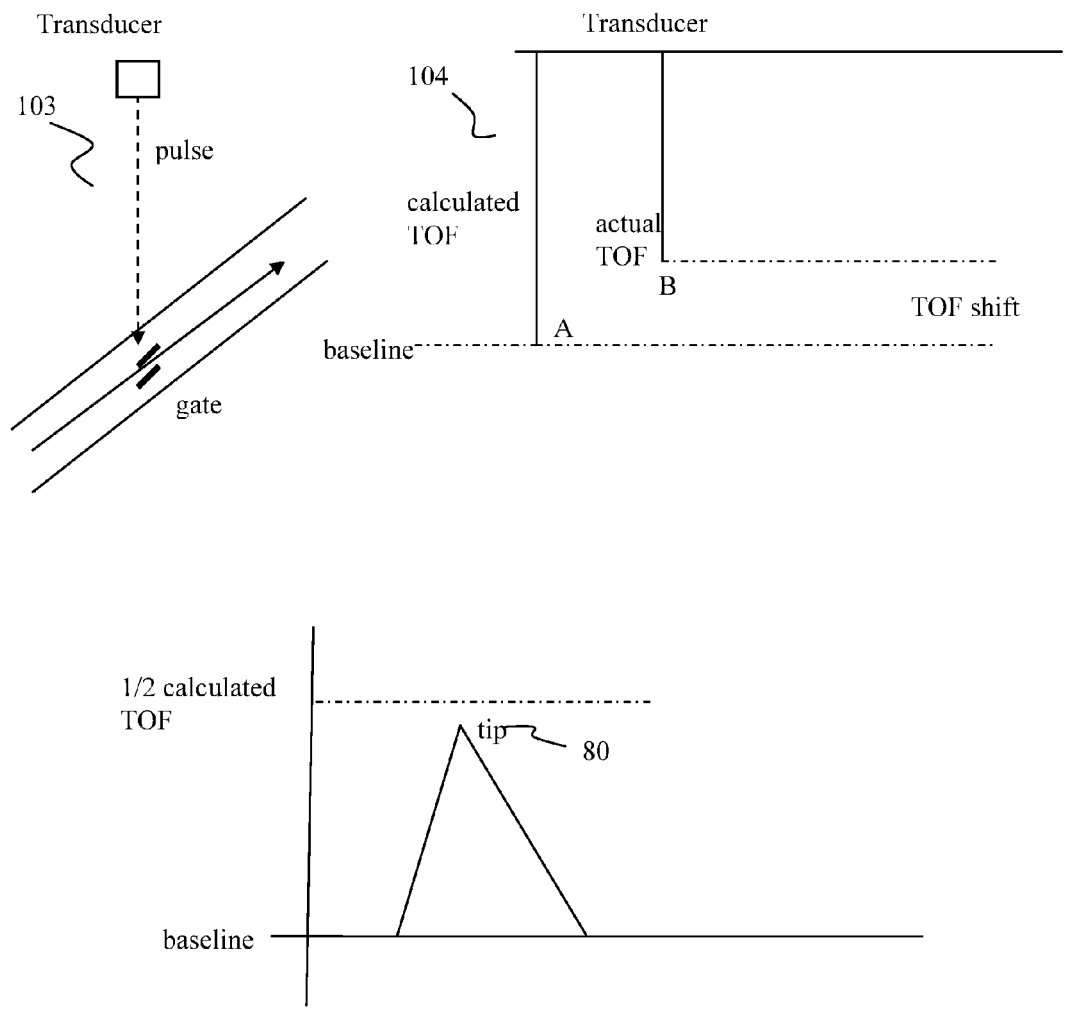
FIG. 3b is a schematic illustration of TOF shift and the profile of TOF shift for forward moving objects of pulsed wave ultrasound.
Figure 3C:
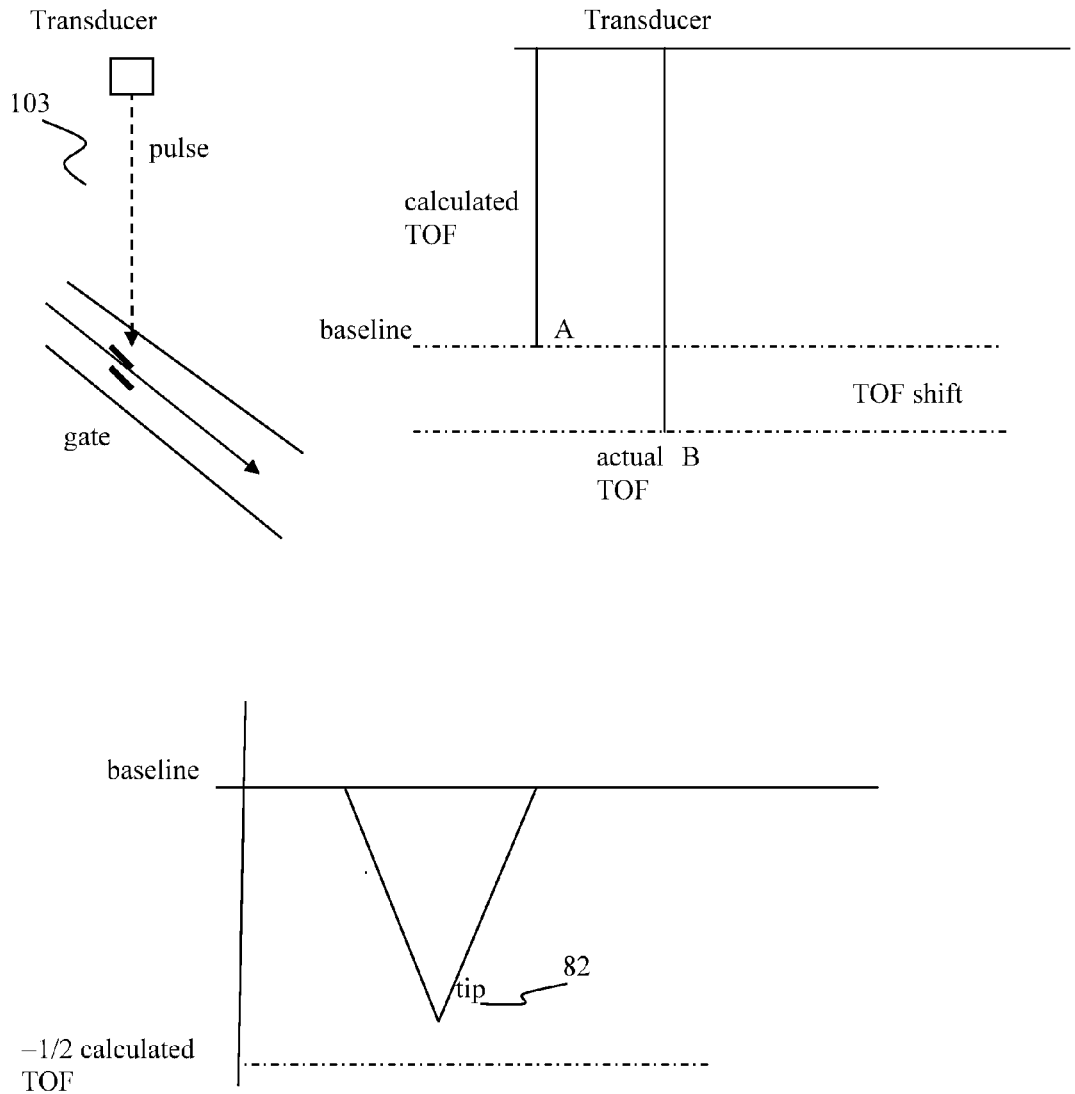
FIG. 3c is a schematic illustration of TOF shift and profile of TOF shift for reversely moving objects of pulsed wave ultrasound.

As 100 in FIG. 3, for the CW ultrasound, a transducer receives all of the reflected ultrasound pulses from an area under the transducer. If there are several moving objects with different velocities toward the transducer, they will rebound the ultrasound pulses with different reflected speeds and TOFs, which generate different TOF shifts related to these moving objects. Then the ultrasound system will trace and compare a list of these reflected pulses and respectively present these TOF shifts on TOF shift spectrum. For CW ultrasound, because there are usually multiple moving objects under the transducer with different velocities, such as multiple blood vessels, its TOF shift spectrum often presents as spectral broadening as 102 in FIG. 3a. So, a computer program can be used to calculate the speed of the moving objects based on the values of the TOF shift as in FIG. 7.

Calculating Speed of Moving Objects by TOF Shift for Pulsed Wave and Color Ultrasound There is only one part of PZT elements in a transducer of the pulsed wave ultrasound, which sends and receives ultrasound pulses. So, the transducer has to receive previously reflected pulses before sending next emitted pulses. In order to detect speed of the moving objects, a gate is set with a certain distance. So, based on the average speed of the ultrasound pulses and the distance between the transducer and the gate, a calculated TOF can be obtained as A in FIG. 3b, which is set as the baseline, and the TOF shift at the baseline equals to zero. The detected TOF is that the ultrasound system interprets TOF from the emitted and reflected ultrasound pulses, which can be affected by the moving objects. The actual TOF is the time the ultrasound pulses actually travel between the transducer and the gate. As the ultrasound pulses leave a transducer and enter the transmitting medium, their speed is at maximal and will gradually reduce during the transmitting process. The moving objects will rebound the ultrasound pulses and change the detected TOF, which generates the TOF shift between the calculated TOF and detected TOF. The calculated TOF is based on the average speed of ultrasound pulses in the transmitting medium. So, when the actual TOF excesses its aliasing limit and the value of TOF shift is smaller than the value of a half calculated TOF, ultrasound system will misinterpret the detected TOF, which generates the aliasing. Before the aliasing, the detected TOF is the actual TOF, and after the aliasing, the detected TOF is the aliasing TOF. The TOF shift is difference between the calculated TOF and the detected TOF. For a forward moving object, it accelerates the speed of the reflected pulses, which shorten its actual TOF as B in FIG. 3b. So, the actual TOF is smaller than the calculated TOF, and the TOF shift is above the baseline. As increasing the speed of the moving objects, the value of the detected TOF decreases and the value of the TOF shift increases, tip of the profile of the TOF shift is away from the baseline (80 in FIG. 3b). On the contrary, reversely moving objects elongate their actual TOF, which is greater than the baseline, and the TOF shift is below the baseline. As the speed of the moving objects increases, the value of the detected TOF and the value of the TOF shift both increase, and the tip of the profile of the TOF shift is away from the baseline(82 in FIG. 3c). Then the speed of the moving objects can be calculated according the value of the TOF shift.

$$TOF\ shift = calculated\ TOF - detected\ TOF$$

$$TOF\ shift = \frac{2 \times speed\ of\ moving\ objects \times transducer\ frequency \times \cos\theta}{pulse\ propagation\ speed}$$

Identifying and Correcting Aliasing for Pulsed Wave Ultrasound

For the pulsed wave ultrasound, there is the aliasing, which is caused by the ultrasound system misinterpreting the detected TOF from the reflected ultrasound pulses. If the speed of the moving objects is too fast, and makes its actual TOF excesses its aliasing limit, the ultrasound system will misinterpret it and the detected TOF becomes an aliasing TOF. Then the aliasing TOF shift is located on opposite side of the baseline, which presents the moving objects as toward opposite direction. The aliasing TOF shift also disrupts continuation of the profile of the TOF shift.

Figure 4:
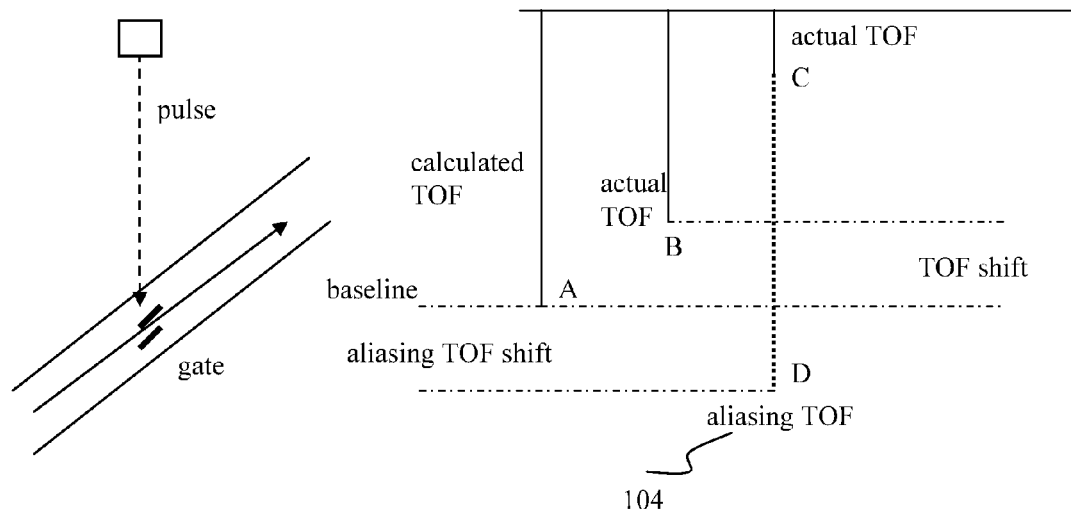
FIG. 4 is a schematic illustration of aliasing TOF and aliasing TOF shift
Figure 5A:
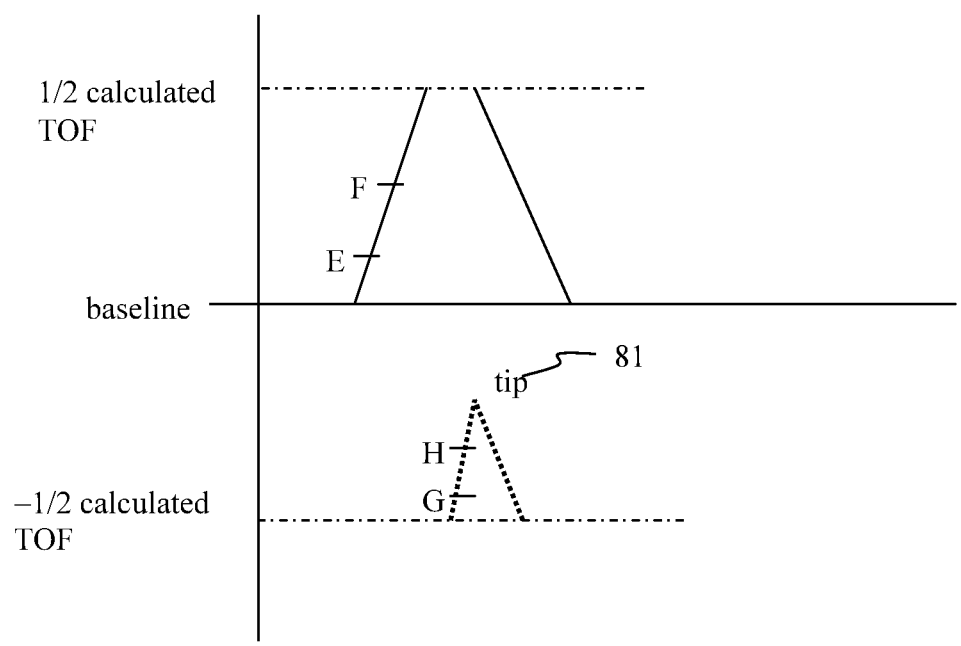
FIG. 5a is a schematic illustration of profile of aliasing TOF shift for forward flow of pulsed wave ultrasound.
Figure 5B:
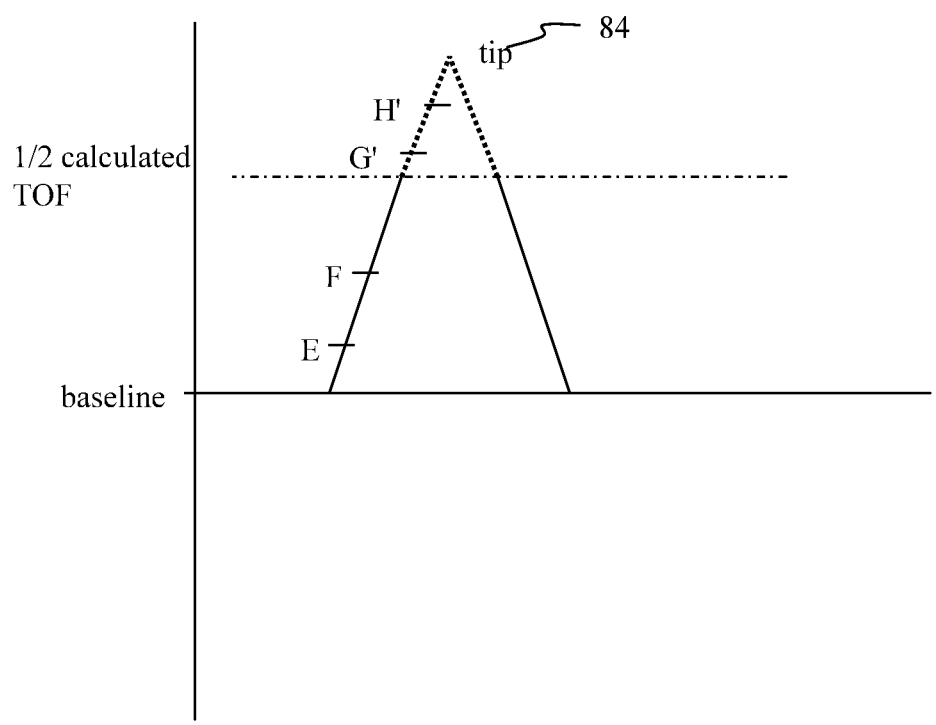
FIG. 5b is a schematic illustration of profile of corrected TOF shift for forward flow of pulsed wave ultrasound.

For forward moving objects, their aliasing limit of the actual TOF is less than the value of half calculated TOF. if the actual TOF is smaller than its aliasing limit, the ultrasound system will misinterpret the reflected pulses, and the aliasing TOF is a value of a actual TOF adding a calculated TOF, which is larger than the calculated TOF (104 in FIG. 4). So, the aliasing TOF shift becomes below baseline, which misrepresents the moving objects moving toward opposite direction. As the result, before the actual TOF excesses its aliasing limit, the value of the TOF shift is above the baseline(from E to F in FIG. 5). But, after the actual TOF excesses its aliasing limit, the value of the aliasing TOF shift is below the baseline(G and H in FIG. 5a); As the speed of the moving objects increases, both the value of the aliasing TOF and the value of the aliasing TOF shift decrease; and the tip of the profile of the aliasing TOF shift is toward the baseline (81 in FIG. 5a), which discontinues the profile of the TOF shift.

Aliasing *TOF*=actual *TOF*+calculated *TOF*

Aliasing *TOF*shift=calculated *TOF*-aliasing *TOF*

Aliasing *TOF*shift=-actual *TOF*

Figure 8:
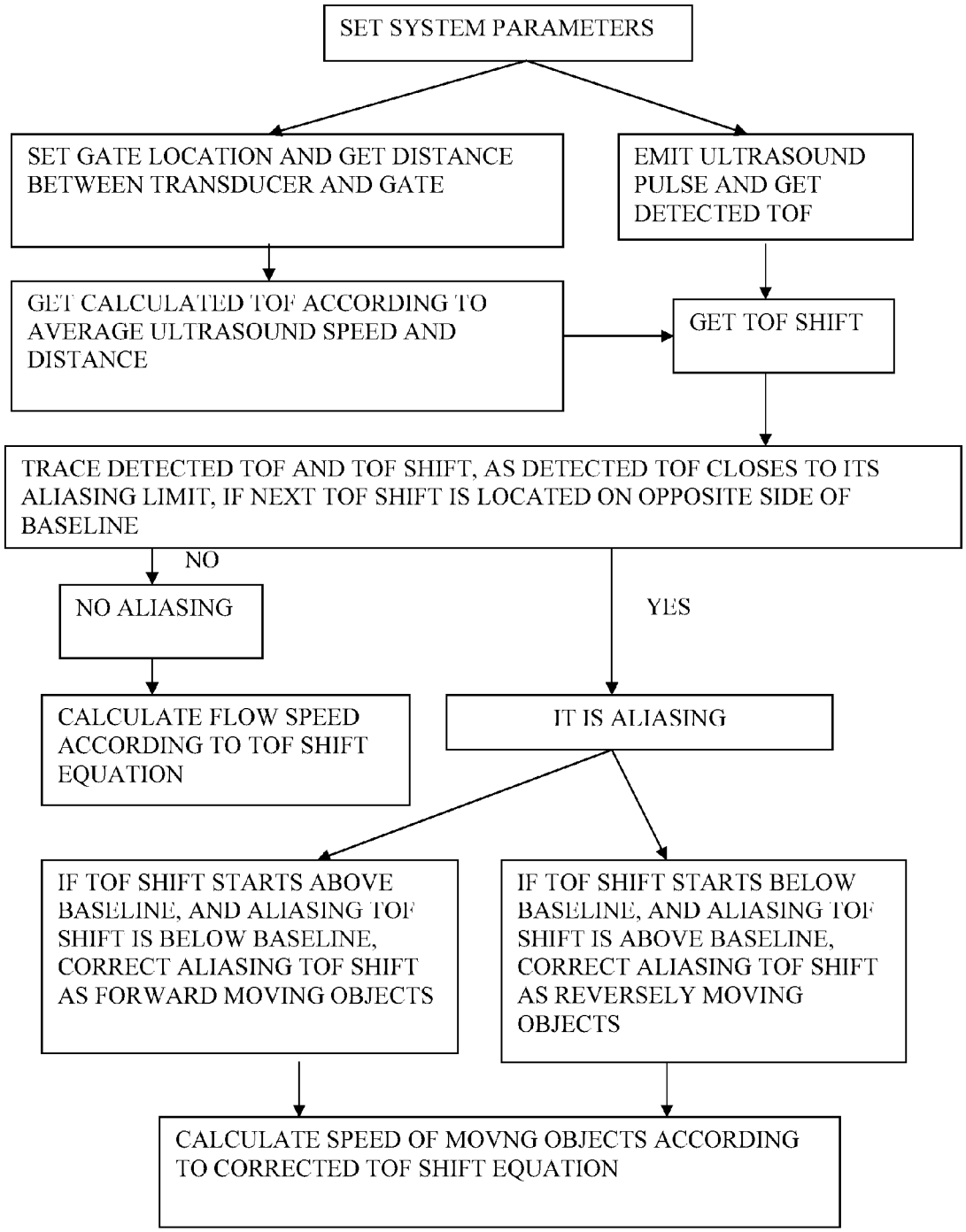
FIG. 8 is a schematic illustration of computer program to identify and correct aliasing TOF shift, and calculate the speed of moving objects for pulsed wave and color ultrasound.

So, in the invention, a computer program is designed to identify and correct the aliasing TOF shift. For the forward moving objects, the actual TOF is smaller than calculated TOF, and its TOF shift is above the baseline. As the speed of moving objects is increased, its actual TOF keeps decrease and smaller than the calculated TOF, and the TOF shift keeps increase and above baseline. But, after the actual TOF excesses its aliasing limit, the aliasing TOF becomes greater than the calculated TOF, and the aliasing TOF shift becomes below the baseline. The computer program will trace and compare the value of the following TOF and TOF shift with the value of the previous TOF and TOF shift. If the value of the TOF and the TOF shift approaches the value of half calculated TOF, and the value of following TOF shift is below the baseline, which discontinues the profile of the TOF shift. It is an aliasing TOF shift. After identifying the aliasing TOF shift, the ultrasound system will register the corrected TOF shift by subtracting the value of the aliasing TOF shift from one calculated TOF(116 in FIG. 8).

*TOF*shift=calculated *TOF*-actual *TOF*

Aliasing *TOF*shift=-actual *TOF* corrected *TOF*shift=calculated *TOF*-|aliasing *TOF*shift|

After rectifying the registering errors of TOF shift, the value of the corrected TOF shift will keep increase as increase of the speed of the moving objects, and the tip of the profile of the TOF shift is away from the baseline (84 in FIG. 5b), which reestablish the continuation of the profile of the TOF shift (FIG. 5b), and the value of the correct TOF shift can be used to calculated the speed of the moving objects.

Figure 6A:
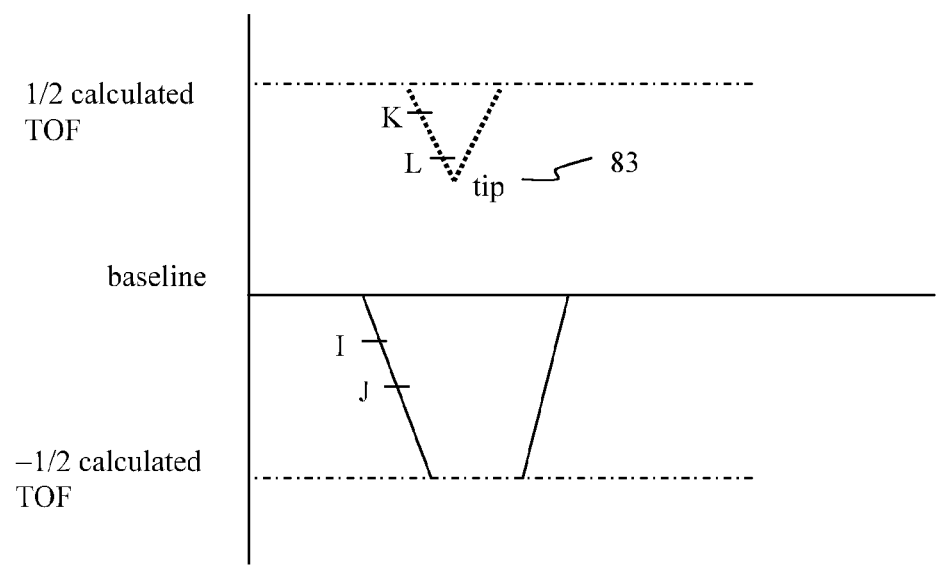
FIG. 6a is a schematic illustration of profile of aliasing TOF shift for reversed flow of pulsed wave ultrasound.

For the reversely moving objects, the rebounding force is reduced, which decreases the reflected speed of the ultrasound pulses and increases their TOF, which is greater than the value of the calculated TOF. So, the value of the TOF shift is below the baseline. For the reversely moving objects, the aliasing limit of the actual TOF is larger than the value of one and half calculated TOF. If the value of the actual TOF excesses its aliasing limit, the ultrasound system will misinterpret the reflected ultrasound pulses and the aliasing TOF is the value of the actual TOF subtracting a calculated TOF, which is smaller than the calculated TOF. So, the aliasing TOF shift will be above the baseline; as the speed of the reversely moving objects keeps increase, the aliasing TOF is increased but the aliasing TOF shift is decreased, which make the tip of the profile of TOF shift is toward baseline (83 in FIG. 6a). As a result, the continuity of the profile of TOF shift is disrupted (FIG. 6a). In the invention, the computer program is used to identify the aliasing. As the value of actual TOF is close to the value of one and half calculated TOF and TOF shift approaches the value of half calculated TOF, if following TOF shift is above the baseline, the aliasing TOF shift is identified.

Aliasing *TOF*=actual *TOF*-calculated *TOF*

Aliasing *TOF*shift=calculated *TOF*-aliasing *TOF*

Aliasing *TOF*shift=2×calculated *TOF*-actual *TOF*

After identifying the aliasing TOF shift, the computer program will rectify the aliasing TOF shift by subtract the value of a calculated TOF from the value of the aliasing TOF shift, which is based on following equations:

*TOF*shift=calculated *TOF*-actual *TOF* aliasing *TOF*shift=2×calculated *TOF*-actual *TOF* correct *TOF*shift=aliasing *TOF*shift-calculated *TOF*

Figure 6B:
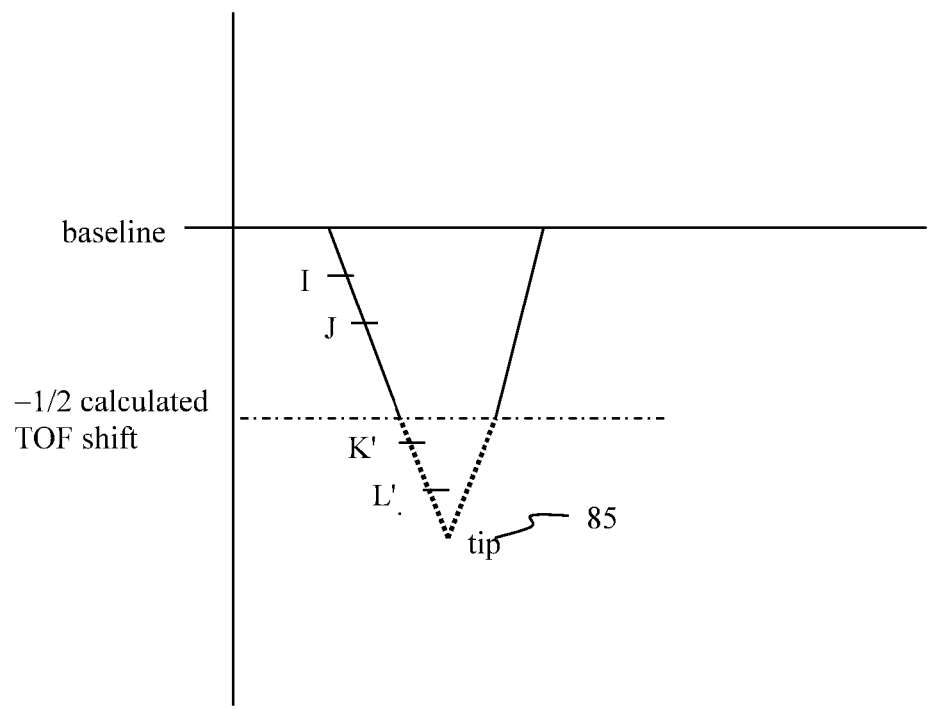
FIG. 6b is a schematic illustration of profile of corrected TOF shift for reversed flow of pulsed wave ultrasound.

After correcting the aliasing TOF shift, the corrected TOF shift will increase as the speed of the moving objects keeps increase, which makes the tip of the profile of the corrected TOF shift away from the baseline. The corrected TOF shift will reestablish the continuation of the profile of the TOF shift (FIG. 6b), and it can be used to calculate the speed of the moving objects.

Another method of avoiding the happening of aliasing is modifying the computer program in the ultrasound system to prevent adding or subtracting the value of a calculated TOF into the detected TOF after the actual TOF excesses its aliasing limit.

Differentiating Color of Aliasing from Color of Turbulent Flows for Color Ultrasound For the color ultrasound, ultrasound system automatically sets different baselines at regular distance along the ultrasound beam. The TOF from reflected ultrasound pulses is compared with their respective baseline and get their TOF shift. Then colors are assigned according to a value of the TOF shift to represent a velocity of the moving objects. But, there are similar color patterns between color of the aliasing and color of turbulent flows. For the aliasing pattern, the color of the aliasing mistakenly presents as the moving objects toward opposite side after the actual TOF excesses its aliasing limit. For the turbulent flows, the color of the turbulent flows truly presents the moving objects toward opposite side. So, this will make the difficulties for clinical judgment and diagnosis for pathological situations. In the invention, differentiating the color of the aliasing from the color of the turbulent flows is based on the characters of the TOF shift of different colors.

Figure 9:
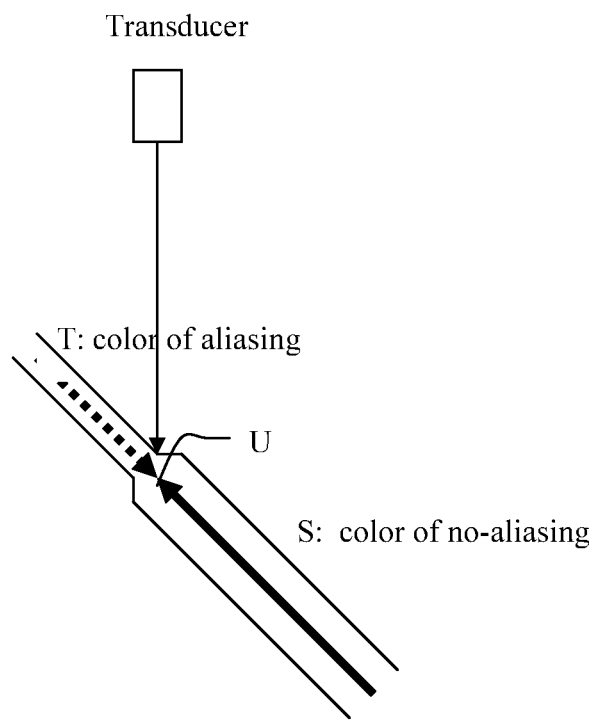
FIG. 9 is a schematic illustration of the color of aliasing in color ultrasound.
Figure 11:
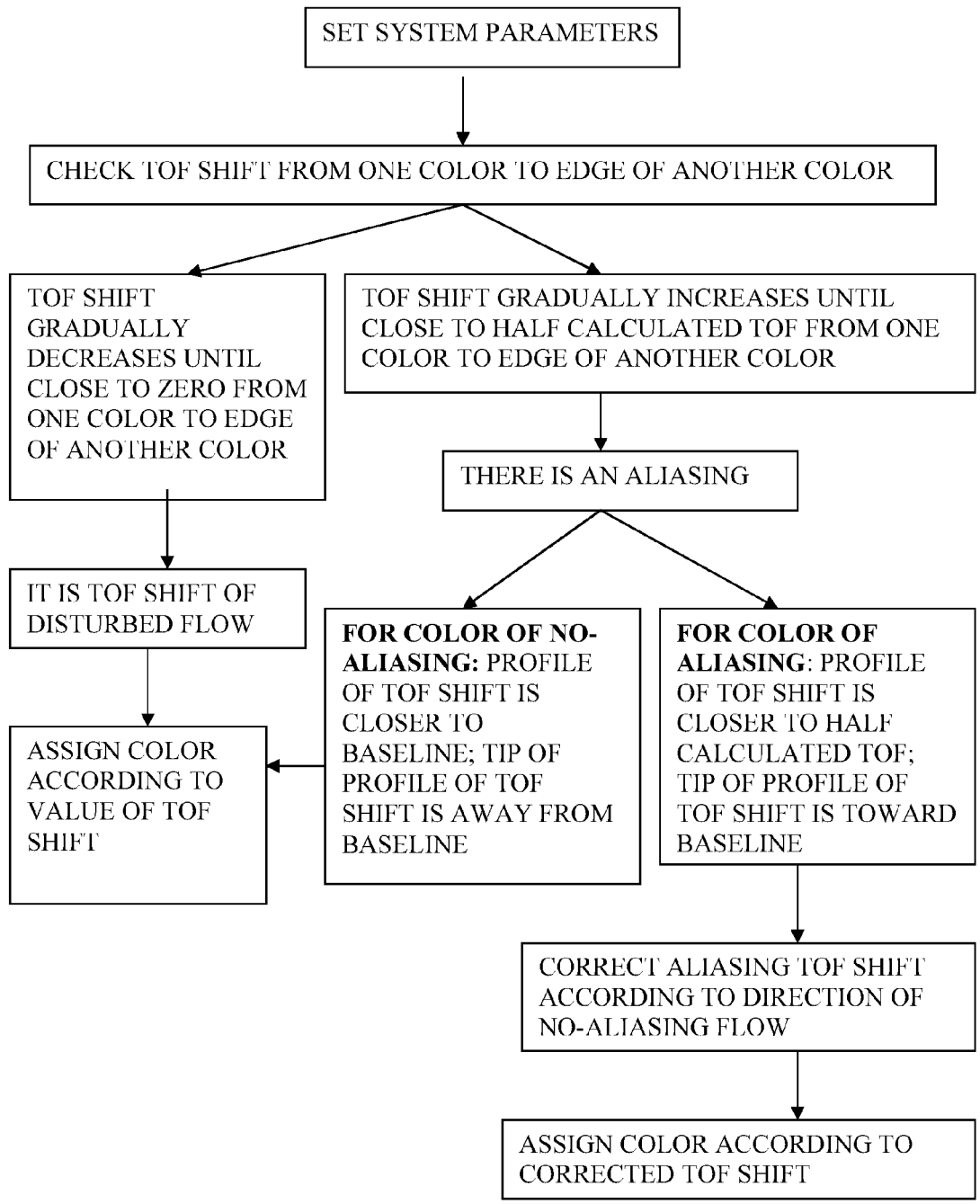
FIG. 11 is a schematic illustration of computer program to differentiate the color of turbulent flow from the color of aliasing and correct color of aliasing based on TOF shift.

For the color of the aliasing in FIG. 9, when a forward flow (S) passes a narrow part of vessel, the speed of a blood flow will be accelerated within the narrow part. If its actual TOF excesses its aliasing limit, the aliasing TOF shift marks the flow with a color of the aliasing (T) at the narrow part, which represents the blood flow as toward opposite direction. Color of U represents the flow between the color of the no-aliasing S and the color of the aliasing T, and the value of TOF shift for the color U is close to the value of half calculated TOF because the actual TOF for the color U is closing to its aliasing limit. From the color T to the color U, or from the color S to the color U, their TOF shift is gradually increased until close to the value of half calculated TOF. For the color of the aliasing, the profile of the aliasing TOF shift will be more close to the value of half calculated TOF with its tip of the profile of the aliasing TOF shift toward baseline. But for the color of the no-aliasing (color S), the profile of the no-aliasing TOF shift will be more close to the baseline with the tip of the profile of the no-aliasing TOF shift away from the baseline. Correcting the aliasing TOF shift is based on the direction of no-aliasing flow as forward or reversely moving direction. Then the color of the aliasing can be corrected based on the corrected TOF shift. The designed computer program in FIG. 11 will trace and identify the characters of the profile of the TOF shift for theses colors, and correct the color of the aliasing by rectifying their aliasing TOF shift.

Figure 10:
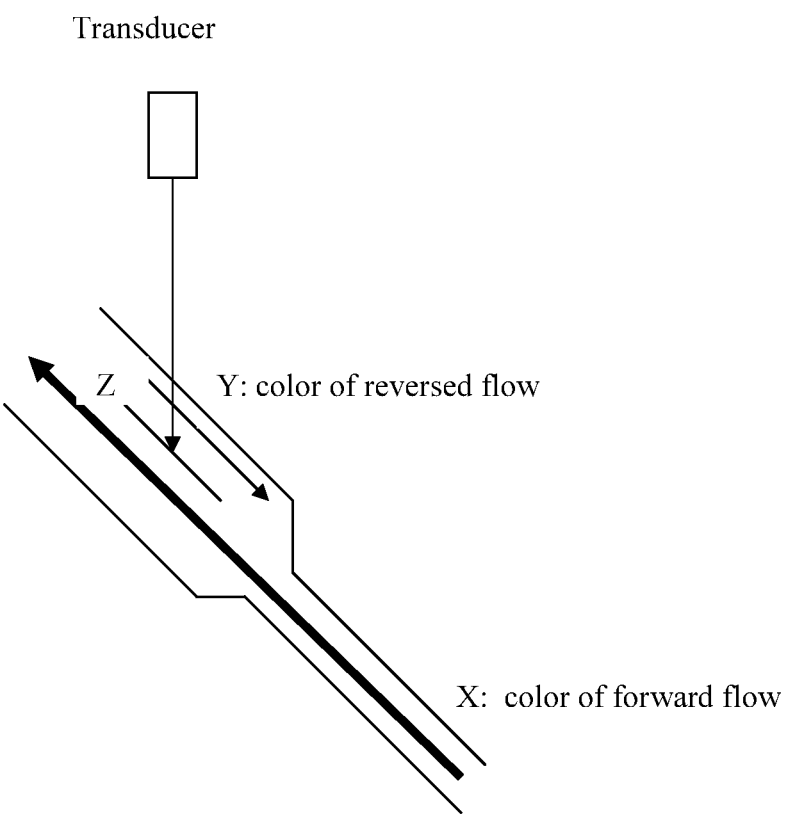
FIG. 10 is a schematic illustration of the colors of turbulent flow in color ultrasound.

But, for the color of the turbulent flows in FIG. 10, the color of X represents a forward flow that enters in an enlarged part of a blood vessel. The flow will become turbulent at the enlarged part of the vessel, and the color of Y represents a reversed blood flow. The color of Z represents the edge between the flow X and the flow Y. The TOF shift for the color Z will be close to zero because its actual TOF is close to its baseline. Because the speed of the flow is gradually decreased to the edge Z, the TOF shift from one color to the edge of another color is gradually reduced until close to the zero. The tip of the profile of the TOF shift for both colors is away from the baseline and the profile of their TOF shift keeps its continuity. The colors of flows are assigned based on their TOF shift.

So, differentiating and correcting the aliasing TOF shift for the color of aliasing from the TOF shift for the color of turbulent flows will benefit the clinical judgment and diagnosis for truly pathological conditions.

Figure 12:
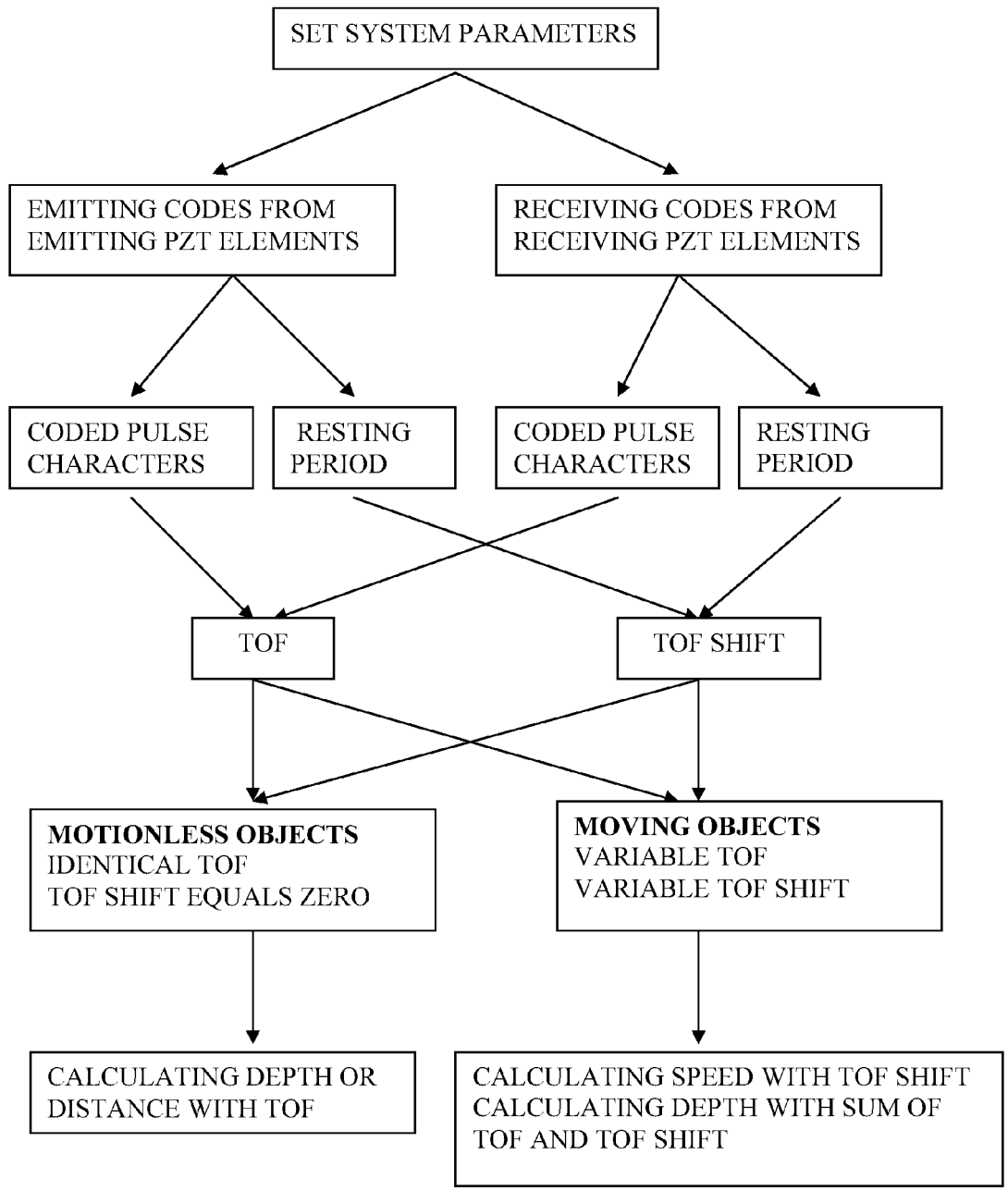
FIG. 12 is a schematic illustration of calculation of detecting depth and moving speed of objects with coded ultrasound pulses.

Calculation of Detecting Depth and Moving Speed of Objects with Coded Ultrasound Pulses Because the pulsed wave ultrasound causes the aliasing and the continuous wave ultrasound loses information of distance, a method of coding ultrasound pulses can combine advantages of the pulsed wave ultrasound and the continuous wave ultrasound as well as avoid their disadvantages. This method is more like coding genomic sequence of deoxyribonucleic acid (DNA). A pulse duration is a time that ultrasound pulses are sent. During each pulse duration, different numbers of ultrasound pulses are sent, which is assigned a pulse character. For instance, just one pulse within the pulse duration is assigned as pulse character A, two pulses as pulse character C, three pulses as pulse character G, and four pulses as pulse character T. A resting period is a time between each adjacent pulse duration, and the resting period for the emitted ultrasound pulses keeps identical. A transducer of the ultrasound system contains one pair or more of sending PZT elements and receiving PZT elements. The sending PZT elements send ultrasound pulses with specific coded pulse characters, such as ATC GCG . . . , which is like codes of DNA sequence. By this way, it actually endows information of emitting time for each pulse character. The receiving PZT elements receive reflected ultrasound pulses, which contain the same codes of pulse characters, such as ATC'G'C'G' . . . , which contains information of receiving time for each pulse character. Therefore, TOF can be obtained from a time difference of emitting time and receiving time of the related pulse characters. At the same time, TOF shift can also obtained from the time difference of emitting resting time and receiving resting time of the related pulse characters. For instance, TOF of pulse character A can be obtained from a time difference between pulse the emitted pulse character A and the reflected pulse character A', and TOF shift can be obtained from a time difference between the emitted resting period of the pulse character A and the receiving resting period of the pulse character A'. If reflections of ultrasound pulses from one point keep identical TOF and their TOF shift is zero, it means the reflections coming from a motionless object. So, the TOF can be used to calculate the depth or distance of the motionless object. If the TOF and the TOF shift keep variable, it means the reflections coming from a moving object. So, the TOF shift can be used to calculate the speed of the moving object. Because the moving object changes the TOF, which can not be used to calculate its actual location. By adding the TOF shift into the TOF, the TOF shift compensates the changed part of TOF. For the forward moving objects, the TOF shift is positive, which will compensate shortened TOF. For the reversely moving object, the TOF shift is negative, which will offset extended TOF. So, sum of TOF shift and TOF can be used to calculate the depth or distance of the moving object. The depth or distance of the moving objects is a half multiplication value of the sum of TOF shift and TOF with the average speed of ultrasound in the transmitting medium. Both the speed and location of the moving objects can be used in the imaging of the color ultrasound. So, the method of the coded ultrasound pulses combines the advantages of the pulsed wave ultrasound and the continuous wave ultrasound in the ultrasound system, which can obtain the information of distance and speed of the detecting objects at the same time (FIG. 12). It also avoids aliasing for detecting moving objects with high velocity.

Improving Imaging Quality with Coded Ultrasound Pulses

Because each PZT element may not only receive reflected ultrasound pulses emitted by itself but also receive the reflected ultrasound pulses emitted from other PZT elements, which cause noise and artifacts, such as mirror image or refraction. The noise and artifacts will affect quality of ultrasound images. With each PZT element emits its specific codes of pulse characters, after receiving reflected ultrasound pulses, the ultrasound system will compare the received codes of pulse characters with the emitted ones, and register locations of reflecting objects that have the same received codes of the pulse characters with the emitted codes of the pulse characters to an area belonging to the PZT element that emits the codes of the pulse characters. By this way, it may improve the noise and the artifacts.

Detecting Depth and Speed of Moving Objects in Other Applications of Sound

Ultrasound just occupies sound wave with frequencies of more than 20 kilohertz. Actually the sound wave with any frequencies has the same mechanisms mentioned as above. So, the applications in detecting depth and calculating a speed of moving objects as mentioned above can be used in sound wave with any other sound frequencies, such as radar and sonar.

Other applications, advantages, alternations, modifications, or equivalents to the disclosed embodiments are obvious to those skilled in the art and are intended to be encompassed within the scope of the present disclosure.

What is claimed is:

1. A method for calculating a detecting depth as speed reduction of ultrasound pulses during a transmission, the method comprising:

calculating a speed reducing coefficient of the ultrasound pulses in a transmitting medium, wherein the speed reducing coefficient of the ultrasound pulses is directly proportional to the density of the transmitting medium and the sound speed in the PZT elements, and inversely proportional to a density and a thickness of the PZT elements, which comprising:

$$\text{Speed reducing coefficient} = \frac{\text{medium density} \times \text{sound speed in } PZT}{PZT \text{ density} \times PZT \text{ thickness}}$$

obtaining an average speed ($V_{avg}$) of the ultrasound pulses in the transmitting medium, wherein the average speed of the ultrasound pulses is a difference between the maximal speed ($V_m$) of the ultrasound pulses in the transmitting medium with a multiplication result of the speed reducing coefficient and the maximal speed of the ultrasound pulses in the transmitting medium, which comprising:

$V_{avg} = V_m = (1-\text{speed reducing coefficient})$; and determining a detecting depth, wherein the detecting depth is a half multiplication value of the average speed and a traveling time of the ultrasound pulses in the transmitting medium.

2. A method of claim 1, further comprising changing one or more of thickness and density of the PZT elements to regulate a quantity of the ultrasound pulses, wherein the thickness of the PZT elements decides a length of the ultrasound pulses, and the density of the PZT elements decides a density of the ultrasound pulses, and the quantity of the ultrasound pulses is a multiplication value of the thickness and the density of the PZT elements, which comprising:

Sound quantity=$PZT$ thickness×$PZT$ density.

3. The method of claim 2, further comprising changing energy of the ultrasound pulses to regulate the detecting depth of the ultrasound pulses wherein the energy of the ultrasound pulses equals a multiplication value of the quantity and the speed of the ultrasound pulses, increasing one or more of the thickness of the PZT elements and the density of PZT elements and sound speed in the PZT elements increases the energy of the ultrasound pulses and the detecting depth of the ultrasound pulses in the transmitting medium.

4. The method of claim 3, further comprising increasing detecting depth for high frequency ultrasound by increasing the density of the PZT elements and the sound speed in the PZT elements wherein increasing the sound speed in the PZT elements and the density of the PZT increases the frequency of the ultrasound pulses as well as their energy.

5. The method of claim 2, further comprising improving axial resolution by decreasing a length of the ultrasound pulses wherein the thickness of the PZT elements decides the length of the ultrasound pulses as well as limits the highest frequency a ultrasound system can reach.

6. A method of using time of flight (TOF) shift of the ultrasound pulses to calculate a speed of moving objects in a continuous wave, a pulsed wave and a color ultrasound, the method comprising:

setting a baseline wherein the baseline is a span of traveling time of the ultrasound pulses reflected from motionless objects at the same depth as from the moving objects, and a TOF shift equals to zero at the baseline;

obtaining a detected TOF wherein the detected TOF is a traveling time that ultrasound system interprets from the reflected ultrasound pulses, the detected TOF is related to the speed of the moving objects and an angle of the moving objects with a ultrasound beam, and the quantity of the ultrasound pulses;

calculating a TOF shift wherein the TOF shift is a difference between the baseline and the detected TOF; and calculating the speed of the moving objects based on an equation of TOF shift wherein θ is the angle of a ultrasound beam made with the moving objects, an average speed ($V_{avg}$) of the ultrasound pulses is determined by a transmitting medium for the ultrasound pulses, and the TOF shift is the TOF shift for the continuous wave, the pulsed wave and the color ultrasound, the equation of TOF shift is:

$$\text{TOF shift} = \frac{2 \times \text{speed of moving objects} \times \text{transducer frequency} \times \cos\theta}{V_{avg}}.$$

7. The method of claim 6, further comprising changing the angle of the ultrasound pulses with the moving objects to regulate a rebounding force wherein the changes of the rebounding force alter the TOF and the TOF shift of the ultrasound pulses.

8. The method of claim 6, further comprising changing the quantity of the ultrasound pulses to regulate the speed of the reflected ultrasound pulses wherein the changes of the speed of the reflected ultrasound pulses alter the TOF and the TOF shift of the ultrasound pulses.

9. The method of claim 6, further comprising a method of calculating the speed of the moving objects for the continuous wave ultrasound comprising:

setting a time of a emitted period as the baseline wherein the time of the emitted period is the time between previously and following emitted pulses;

obtaining a time of a reflected period as the detected TOF wherein the time of the reflected period is the time between previously and following reflected ultrasound pulses;

calculating a TOF shift wherein the TOF shift is a difference between the time of the emitted period and the time of the reflected period; and using the TOF shift to calculate the speed of the moving objects based on the equation of TOF shift.

10. The method of claim 6 further comprising a method of calculating the speed of the moving objects for the pulsed wave and the color ultrasound comprising:

setting a time of a calculated TOF as the baseline wherein the calculated TOF is the time that ultrasound system calculates according to a distance between a transducer and a gate and the average speed of the ultrasound pulses in the transmitting medium;

obtaining the detected TOF wherein the detected TOF is the time that ultrasound system interprets from ultrasound pulses traveling between the transducer and the gate, before a aliasing the detected TOF is an actual TOF, and the actual TOF is a truly traveling time of the ultrasound pulses;

calculating a TOF shift wherein the TOF shift is a difference between the value of the calculated TOF and the value of the detected TOF; and using the TOF shift to calculate the speed of the moving objects based on the equation of TOF shift.

11. The method of claim 10 further comprising a method to correctly calculate the speed of the moving objects after an aliasing for the pulsed wave and the color ultrasound comprising:

identifying an aliasing of the ultrasound pulses, wherein as the actual TOF excesses its aliasing limit, the detected TOF is misinterpreted by ultrasound system to generate a aliasing TOF, the aliasing TOF shift is on opposite site of the baseline and disrupts continuity of a profile of the TOF shift, and a tip of the profile of the aliasing TOF shift is toward the baseline;

obtaining a corrected TOF shift by rectifying the aliasing TOF shift to correct registration of the reflected ultrasound pulses after the actual TOF exceeds the aliasing limit; and using the corrected TOF shift to calculate the speed of the moving objects based on an equation of corrected TOF shift:

$$\text{Corrected } TOF \text{ shift} = \frac{2 \times \text{speed of moving objects} \times \text{transducer frequency} \times \cos\theta}{\text{pulse propagation speed}}.$$

12. The method of claim 11, wherein for forward moving objects, the speed of the moving objects is correctly calculated after the aliasing by:

identifying the aliasing for the forward moving objects wherein the aliasing limit for the actual TOF is less than a value of half calculated TOF; after the actual TOF excesses the aliasing limit, the ultrasound system misinterprets the detected TOF by adding a value of one calculated TOF to a value of the actual TOF to form an aliasing TOF, the value of the aliasing TOF is greater than the value of the baseline and its TOF shift is located on opposite site of the baseline, and the aliasing TOF shift disrupts the continuation of the profile of the TOF shift, and the tip of the profile of the aliasing TOF shift is toward the baseline;

obtaining the corrected TOF shift by subtracting a value of the aliasing TOF shift from a value of the calculated TOF to reestablish the continuation of the profile of the TOF shift; and using the corrected TOF shift to calculate the speed of the forward moving objects based on the equation of corrected TOF shift.

13. The method of claim 11, wherein for reversely moving objects, the speed of the moving objects is correctly calculated after the aliasing by:

identifying the aliasing for the reversely moving objects wherein the aliasing limit for the actual TOF is greater than the value of one and half calculated TOF; after the actual TOF excesses the aliasing limit, the ultrasound system misinterprets the detected TOF by subtracting a value of one calculated TOF from a value of the actual TOF to form an aliasing TOF; the value of the aliasing TOF is smaller than the value of the baseline and the aliasing TOF shift is located on opposite site of the baseline, and the aliasing TOF shift disrupts the continuation of the profile of the TOF shift, and the tip of the profile of the aliasing TOF shift is toward the baseline;

obtaining the corrected TOF shift by subtracting a value of the calculated TOF shift from a value of the aliasing TOF shift to reestablish the continuation of the profile of the TOF shift; and using the corrected TOF shift to calculate the speed of the reversely moving objects based on the equation of corrected TOF shift.

14. The method of claim 10 further comprising a method of avoiding the aliasing by modifying the computer program in the ultrasound system to prevent adding or subtracting a value of a calculated TOF from the detected TOF after the actual TOF excesses its aliasing limit.

15. The method of claim 11, further comprising a method of differentiating a color of the aliasing from a color of turbulent flows and rectifying the color of the aliasing for the color ultrasound comprising:

identifying the aliasing TOF shift for the color of the aliasing wherein from the color of the aliasing to a edge of another color, the value of the TOF shift is gradually increased until close to the value of half calculated TOF, and the profile of the aliasing TOF shift is more close to the value of half calculated TOF, and the tip of the profile of the aliasing TOF shift is toward the baseline; a color of no-aliasing represents a flow before its actual TOF excesses the aliasing limit, the profile of the no-aliasing TOF shift is more closer to the baseline, and the tip of the no-aliasing TOF shift is away from the baseline;

identifying the TOF shift for the color of turbulent flows wherein from one color to a edge of another color, the value of the TOF shift is gradually decreased until close to zero, the tip of the profile of the TOF shift for the color of turbulent flows is away from the baseline; and rectifying the color of the aliasing wherein the aliasing TOF shift is corrected according to the direction of the no-aliasing flow, and the color of the aliasing is corrected based on the value of the corrected TOF shift.

16. A method of calculation of a detecting depth and a moving speed of objects with coded ultrasound pulses comprising:

a transducer contains one pair or more of emitting PZT elements and receiving PZT elements, assigning different numbers of the ultrasound pulses within each pulse duration to form different pulse characters, a resting period is a time between each adjacent pulse duration;

the emitting PZT elements emit specifically coded pulse characters, which endow information of emitting time for each pulse character, and the resting period for the emitted ultrasound pulses keeps identical;

the receiving PZT elements receive reflected ultrasound pulses, and the received codes of pulse characters are compared with the emitted codes of the pulse characters, TOF is obtained from a time difference of the emitted pulse character with the same reflected pulse character, and TOF shift is obtained from a time difference between the emitted resting period and the received resting period;

identifying motionless objects from the reflected ultrasound pulses with identical value of the TOF and zero value of the TOF shift, therein the depth of the motionless objects is calculated from the TOF; and identifying moving objects from the reflected ultrasound pulses with variable value of the TOF and the TOF shift, therein the speed of the moving objects is calculated with the equation of TOF shift, the depth of the moving objects is a half multiplication value of the sum of the TOF and the TOF shift with the average speed of ultrasound in the transmitting medium ($V_{avg}$), for forward moving objects, the TOF shift is positive value, and for reversely moving objects, the TOF shift is negative value, the equation of calculating the depth of the moving objects comprising:

$$\text{depth of moving objects} = V_{avg} \times (TOF + TOF \text{ shift})/2.$$

17. The method of claim 16 further comprising improving noise and artifacts with coded ultrasound pulses wherein by comparing the received codes of the pulse characters with the emitted codes of the pulse characters, the reflections that have the identical received codes of the pulse characters with the emitted codes of the pulse characters will be registered to an area that belongs to the PZT element that emits the codes of the pulse characters.

18. A method of claim 1, further comprising applications in detecting a depth or a distance of objects with sound pulses of any frequencies.

19. A method of claim 6, further comprising applications in calculating a speed of moving objects with sound pulses of any frequencies.

20. A method of claim 16, further comprising applications in detecting depth and distance and moving speed of objects with coding sound pulses with sound pulses of any frequencies.

* * * * *